US012081015B2

United States Patent
Ives et al.

(10) Patent No.: US 12,081,015 B2
(45) Date of Patent: Sep. 3, 2024

(54) PERMANENT MAGNET MACHINE FAULT PROTECTION

(71) Applicant: Hamilton Sundstrand Corporation, Charlotte, NC (US)

(72) Inventors: Kyle Stephen Ives, Loves Park, IL (US); Robert L. Seagren, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 139 days.

(21) Appl. No.: 17/860,550

(22) Filed: Jul. 8, 2022

(65) Prior Publication Data

US 2024/0014646 A1 Jan. 11, 2024

(51) Int. Cl.
*H02H 7/085* (2006.01)
*H02K 1/27* (2022.01)

(52) U.S. Cl.
CPC ............ *H02H 7/0851* (2013.01); *H02K 1/27* (2013.01)

(58) Field of Classification Search
CPC .... H02H 7/0851; H02K 1/27; H02P 2101/30; H02P 2103/20; H02P 2207/05; H02P 29/024; H02P 29/027
USPC .................................................. 318/445, 558
See application file for complete search history.

(56) References Cited

U.S. PATENT DOCUMENTS

| 7,276,871 | B2 * | 10/2007 | Ganev ...................... H02P 9/006 |
| | | | 318/434 |
| 7,652,858 | B2 * | 1/2010 | Tang ..................... H02H 7/0838 |
| | | | 361/33 |
| 7,791,298 | B2 * | 9/2010 | Lee ...................... H02P 23/0004 |
| | | | 318/449 |
| 8,427,092 | B2 | 4/2013 | Rozman et al. |
| 9,438,144 | B2 * | 9/2016 | Xu ............................ H02P 6/12 |
| 2007/0030606 | A1 | 2/2007 | Ganev et al. |

FOREIGN PATENT DOCUMENTS

| EP | 2144345 B1 | 3/2011 |
| WO | 2013071937 A1 | 5/2013 |

OTHER PUBLICATIONS

Extended European Search Report dated Nov. 22, 2023, issued during the prosecution of European Patent Application No. EP 23183983.8.

* cited by examiner

*Primary Examiner* — David Luo

(57) ABSTRACT

A system includes a permanent magnet (PM) machine including a first phase winding and a second phase winding and a permanent magnet configured to rotate relative to the first and second phase windings. The first phase winding has a main leg and a return leg extending from the first phase winding. The second phase winding has a main leg and a return leg extending from the second phase winding. A return switch unit is operatively connected to the return legs of the first phase winding and the second phase winding. The return switch unit includes a switch configured to connect the return legs of the first phase and second phase to a neutral node in the return switch unit in a normal state, and to disconnect the return legs of the first and second phase windings from the neutral node in a fault protection state.

20 Claims, 5 Drawing Sheets

PERMANENT MAGNET MACHINE FAULT PROTECTION

BACKGROUND

1. Field

The present disclosure relates to permanent magnet (PM) machines such as motors and generators, and more particularly to fault protection for PM machines.

2. Description of Related Art

PM electrical machines have several advantages over other types of motors and generators, including weight, design simplicity and reliability. However, due to the use of permanent magnets these machines are always electrically energized when rotating, which creates difficulties when it comes to protecting against electrical faults. Typical wound field synchronous generator designs can remove excitation when a fault is detected and the generator will cease to produce voltage to feed the fault. This method is not available for fault removal in PM-based systems. It is also possible to use an electrically actuated mechanical disconnect to remove the PM machine from its input shaft when a fault is present, however these are typically not resettable during aircraft operation, and it can take some time for the machine to stop rotating while it is still energized. As aircraft move to HVDC (high voltage direct current), there is a desire to rely more on large permanent magnet machines for electrical generation and propulsion motors, however the higher voltages increase the risk of high energy short circuits and arcing faults which necessitate a safe and reliable means of fault isolation.

The conventional techniques have been considered satisfactory for their intended purpose. However, there is an ever present need for improved systems and methods for fault protecting PM machines. This disclosure provides a solution for this need.

SUMMARY

A system includes a permanent magnet (PM) machine including a first phase winding and a second phase winding and a permanent magnet configured to rotate relative to the first and second phase windings. The first phase winding has a main leg and a return leg extending from the first phase winding. The second phase winding has a main leg and a return leg extending from the second phase winding. A return switch unit is operatively connected to the return legs of the first phase winding and the second phase winding. The return switch unit includes a switch configured to connect the return legs of the first phase and second phase to a neutral node in the return switch unit in a normal state, and to disconnect the return legs of the first and second phase windings from the neutral node in a fault protection state. The return legs of the first and second phase windings can extend external from the PM machine. The return switch unit can be external to PM machine.

The return switch unit can include a feedback system configured to trigger the switch into the fault protection state upon a short circuit fault between the main phase legs of the first and second phase windings or a ground fault in one or both of the main phase legs. The feedback system can include one or more fault detection sensors operatively connected to logic and an actuator to drive the switch with a fault detected. The feedback system, can be located external to the PM machine.

The PM machine further can include a third phase winding with a respective main phase leg and a respective return leg. The switch can be a triple pole single throw (3PST) switch connecting the return legs of the first, second, and third phase windings to the neutral node in the normal state, and disconnecting the return legs of the first, second, and third phase windings from the neutral node in the fault protection state. The neutral node can be connected to ground aboard an aircraft.

The PM machine can be a generator, wherein the main legs of the first, second, and third phase windings connect to a rectifier. A main line contactor can connect between the rectifier and the main legs of the first, second, and third phase windings to selectively disconnect the generator from the rectifier.

The PM machine can be a motor wherein the main legs of the first, second, and third phase windings connect to a motor controller, and wherein the return switch unit is a motor return switch unit. A PM generator can be included with a first phase winding, a second phase winding, and a third phase winding, wherein the first, second, and third phase windings of the PM generator connect to the main controller for supplying power to the motor.

A generator return switch can be operatively connected to the return legs of the first, second, and third phase windings of the PM generator, wherein the generator return switch unit includes a switch configured to connect the return legs of the first, second, and third phase windings of the PM generator to a neutral node in the generator return switch unit in a normal state, and to disconnect the return legs of the first, second, and third phase windings of the PM generator from the neutral node in a fault protection state. The neutral node in the generator return switch unit and the neutral node in the motor return switch unit can both be grounded to a ground aboard an aircraft.

A method of fault protection includes rotating a permanent magnet relative to a plurality of phase windings in a permanent magnet machine (PM). The method includes detecting a fault between at least two of the phase windings or a ground fault of one or both of the phase windings, disconnecting respective return legs of all of the phase windings from a neutral point, and allowing the permanent magnet to continue to rotate relative to the plurality of phase windings after the return legs are disconnected from the neutral point.

The permanent magnet and phase windings can be part of a permanent magnet (PM) generator and the method can include generating power with the PM generator prior to disconnecting the return legs, and ceasing generation of power with the PM generator upon disconnecting the return legs while the permanent magnet continues to rotate relative to the phase windings. The permanent magnet and phase windings can be part of a permanent magnet (PM) motor and the method can include using electrical power supplied to the phase windings to power rotation of the permanent magnet in the PM motor prior to disconnecting the return legs, and ceasing to drive rotation of the permanent magnet relative to the phase windings upon disconnecting the return legs while the permanent magnet continues to rotate relative to the phase windings. The method can include grounding a neutral node of the phase windings prior to detecting the fault, wherein disconnecting includes disconnecting the return legs from the neutral node.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
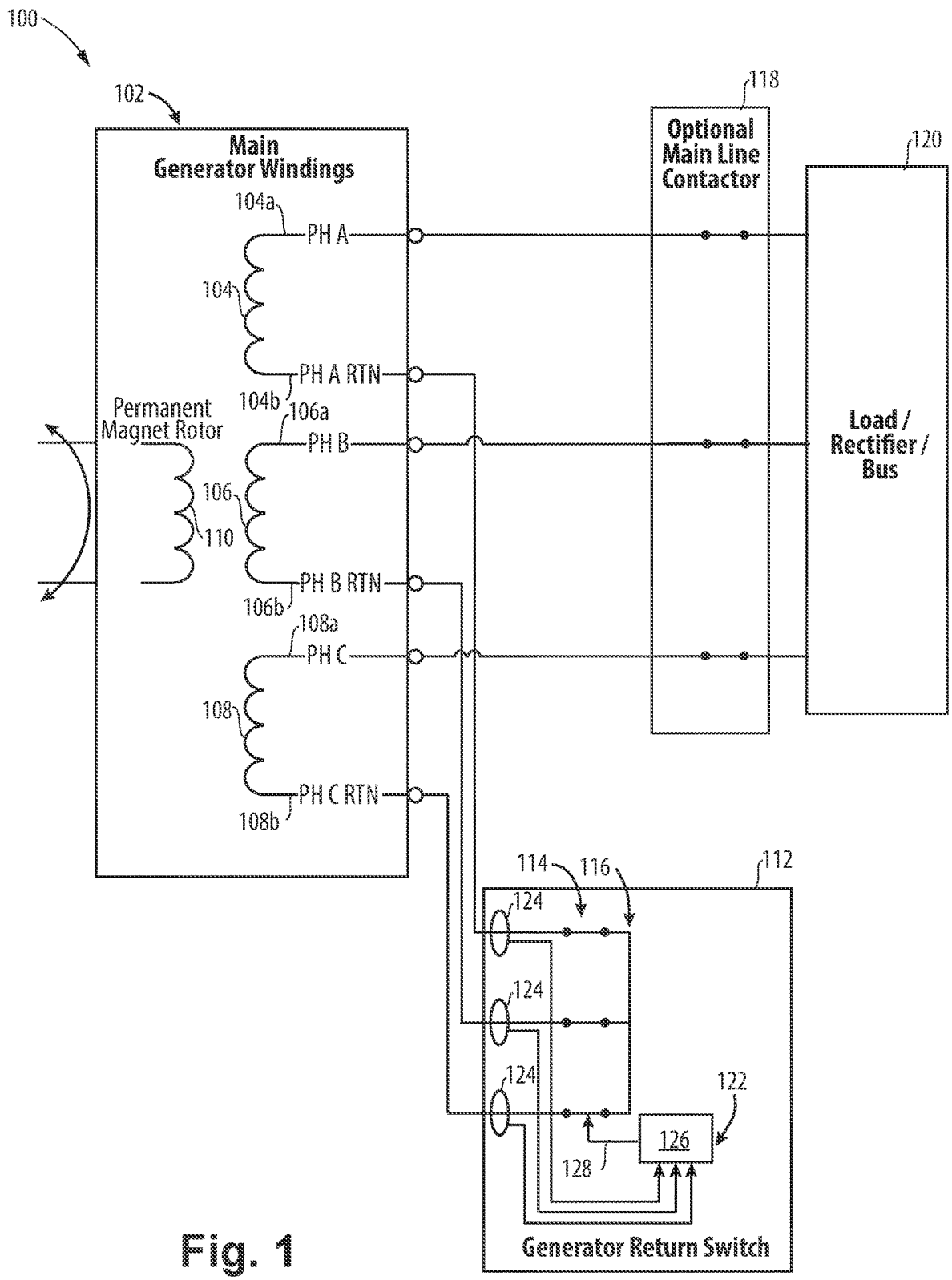
FIG. 1 is a schematic view of an embodiment of a system constructed in accordance with the present disclosure, showing a permanent magnet (PM) machine with a return switch for fault protection.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide fault protection in permanent magnet (PM) machines such as generators and motors, even wherein the machine may continue to undergo rotor rotation after a fault manifests.

The system 100 includes a PM machine 102, which is a generator but motors are also discussed below. The PM machine 102 includes a first phase winding 104, a second phase winding 106, and a third phase winding 108. A permanent magnet 110 is configured to rotate relative to the first, second, and third phase windings 104, 106, 108 as indicated by the double arrows in FIG. 1. The first phase winding 104 has a main leg 104a and a return leg 104b extending from the first phase winding 104. The second phase winding 106 has a main leg 106a and a return leg 106b extending from the second phase winding 106, and the third phase winding 108 similarly has a main leg 108a and a return leg 108b.

Figure 2:
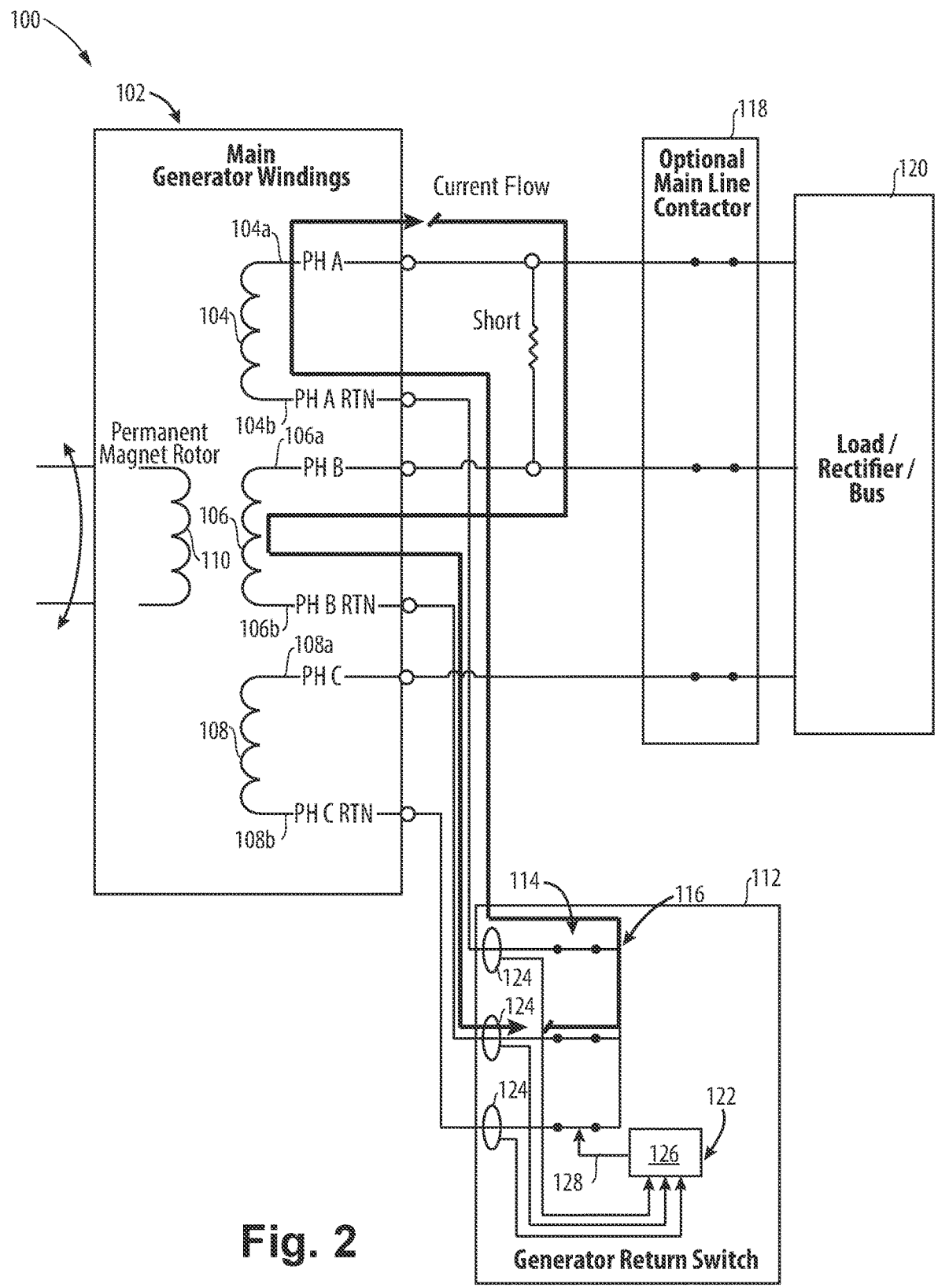
FIG. 2 is a schematic view of the system of FIG. 1, showing a fault where two phases are short circuited.
Figure 3:
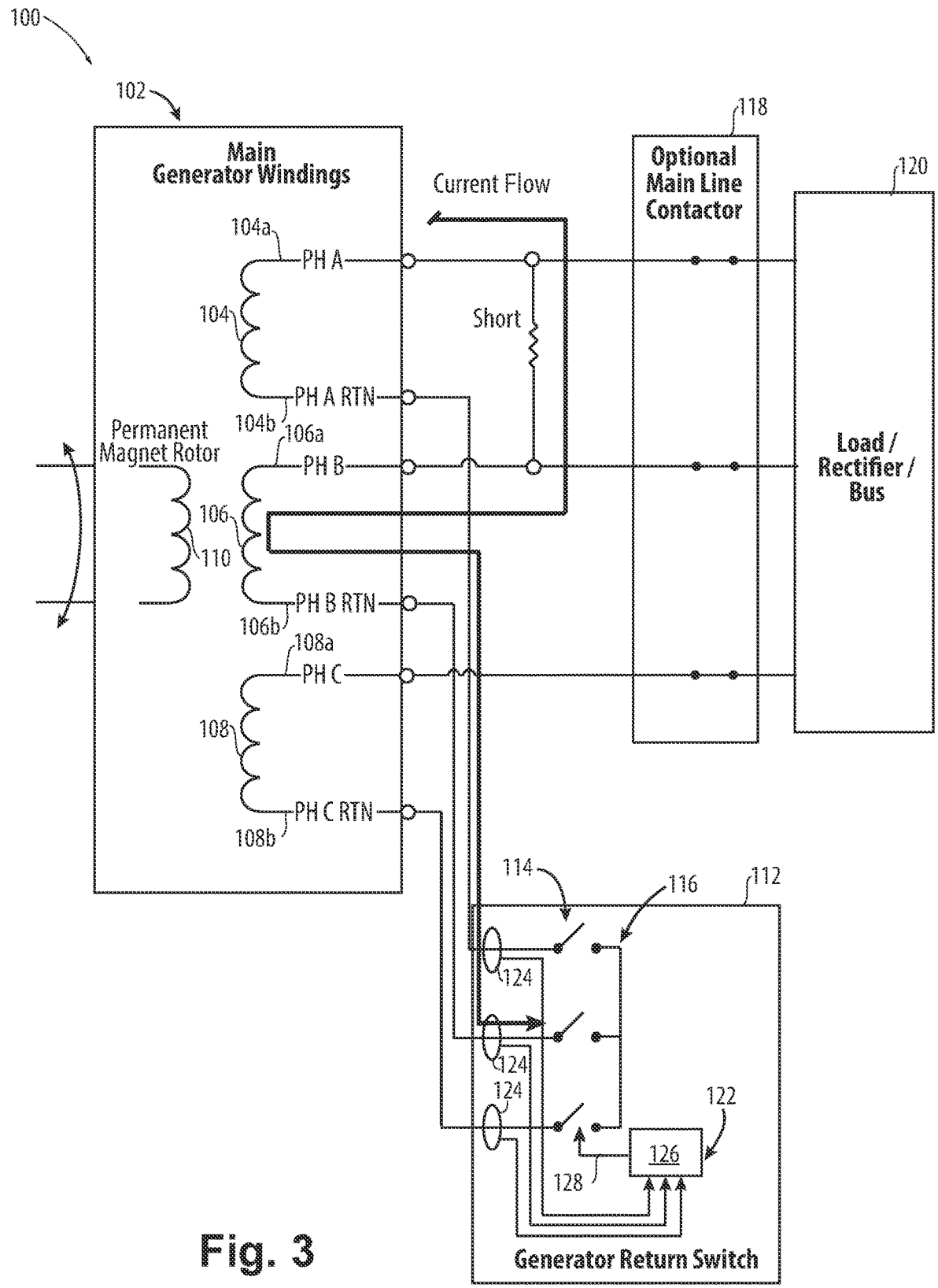
FIG. 3 is a schematic view of the system of FIG. 1, showing the return switch opening the returns of the three phases to protect against the fault.

A return switch unit 112 is operatively connected to the return legs 104b, 106b, 108b. The return legs 104b, 106b, 108b extend external from the PM machine 102. The return switch unit 112 can be external to PM machine 102, however it is also contemplated that the return switch unit can be intergraded into a PM stator housing of the system 100. The return switch unit 112 includes a triple pole single throw (3PST) switch 114 configured to connect the return legs 104b, 106b, 108b to a neutral node 116 in the return switch unit 112 in a normal state as shown in FIG. 1. The switch 114 is configured to disconnect the return legs 104b, 106b, 108b from the neutral node 116 in a fault protection state, including a short circuit of any two or three of the main legs 104a, 106a, 108a as shown in FIG. 2. The neutral node 116 can be a floating neutral, as shown in FIGS. 1-3, or can be connected to ground such as a ground aboard an aircraft (not shown in FIGS. 1-3 but see FIG. 5). If a grounded neutral is used, ground faults of the main legs 104a, 106a, 108a can trigger the fault protection in the return switch unit 112. The switch can disconnect the return legs 104b, 106b, 108b in a deenergized state, e.g. wherein the optional main line contactor 118 disconnects the main legs 104a, 106a, 108a from a bus, rectifier, and/or load schematically indicated by box 120 in FIGS. 1 and 2.

With continued reference to FIGS. 1 and 2, the return switch unit 112 includes a feedback system 122, configured to trigger the switch 116 into the fault protection state shown in FIG. 3 upon detection of a short circuit fault, as shown in FIG. 2, between any two or three of the main phase legs 104a, 106a, 108a. The feedback system 122 includes one or more fault detection sensors 124 operatively connected to logic 126 that is connected to control an actuator 128 to drive the switch 114 with a fault detected by the sensor(s) 124. The feedback system 122 is located external to the PM machine 102. The current flow in FIG. 2 is indicated schematically with the heavy lined arrow, and is similarly indicated in FIGS. 3-5.

Figure 4:
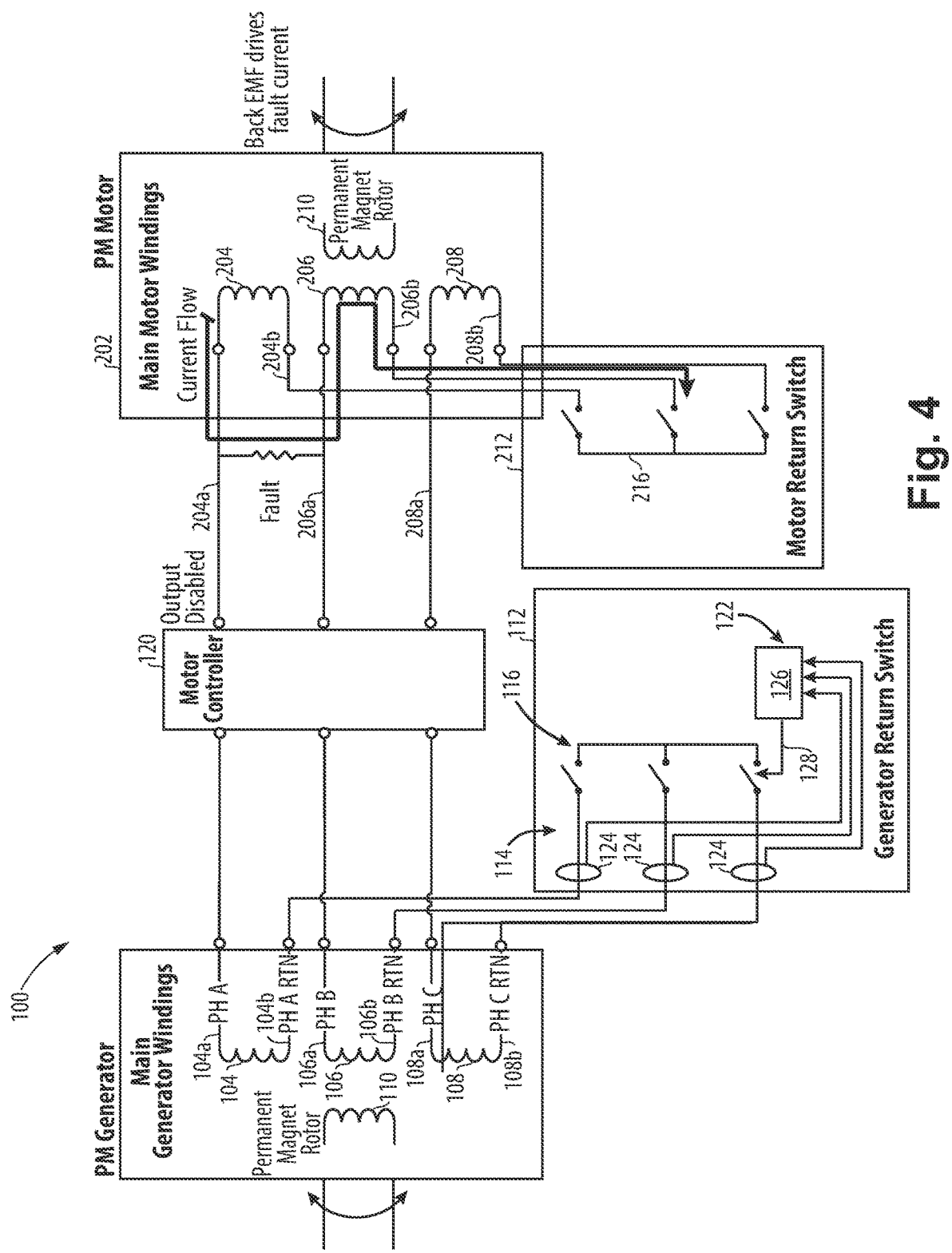
FIG. 4 is schematic view of the system of FIG. 1, showing the PM machine as a generator connected to power a second PM machine that is a motor, wherein both PM machines have a respective return switch for fault protection.
Figure 5:
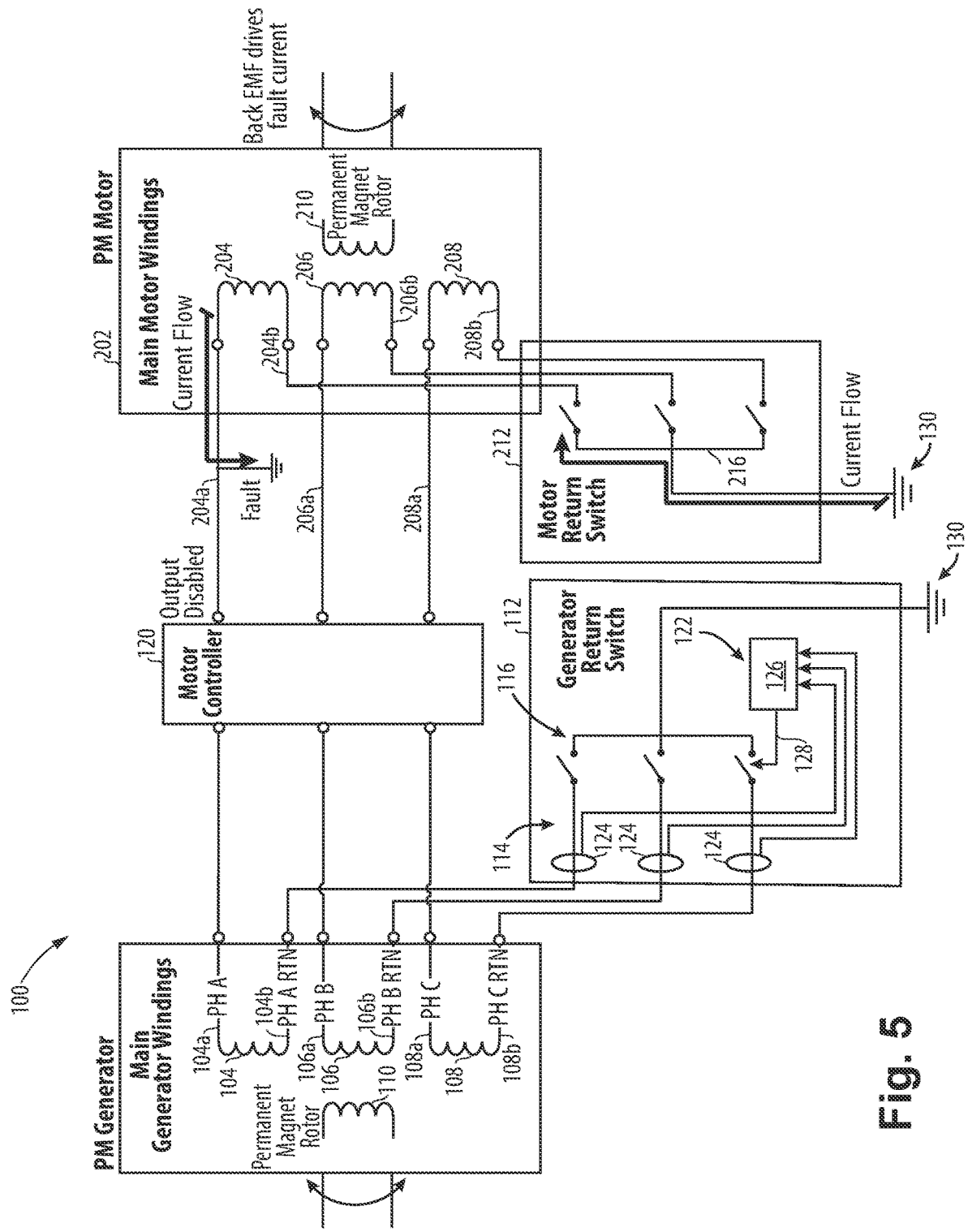
FIG. 5 is a schematic view of the PM machine of FIG. 4, showing the neutral nodes of the return switches grounded instead of floating.

While shown and described above in the context of a PM generator, it is also contemplated with reference to FIG. 4 that a return switch unit as described above can be used for fault protection in a PM motor 202. The PM motor 202 includes main legs 204a, 206a, 208a of the first, second, and third phase windings 204, 206, 208 connect to the load/rectifier/bus component 120, which in this case includes a motor controller. The return switch unit 212 is a motor return switch unit, selectively connecting the return legs 204b, 206b, 208b of the phase windings 204, 206, 208 to the neutral point 216 as described above with respect to FIGS. 1-3. While not pictured in FIGS. 4-5 for sake of clarity in the drawings, the return switch unit 212 includes a feedback system 122, as described above for controlling the switch 214 for fault protection, energizing, and deenergizing the PM motor 202 as described above. The PM generator 102 can be connected to the motor controller 120 for supplying power to the PM motor 202 through the main legs 104a, 106a, 108a. The return switch units 112, 212 can operate together in the event of a fault in either the PM motor main legs 204a, 206a, 208a (as shown in FIG. 4) or the PM generator main legs 104a, 106a, 108a (as shown in FIG. 2-3), or the return switch units 112, 212 can operate fault protection independently for their respective generator or motor 102, 202. The neutral nodes 116, 216 can optionally be floating neutrals as shown in FIG. 4, or can be both grounded, e.g. to a ground 130 aboard an aircraft, as shown in FIG. 5. Grounding the neutral points 116, 216 makes possible ground fault detection, as schematically indicated in FIG. 5.

A method of fault protection includes rotating a permanent magnet, e.g. permanent magnets 110, 210, relative to a plurality of phase windings, e.g. phase windings 104, 106, 108 or 204, 206, 208, in a PM machine, e.g. PM machine 102, 202, as indicated by the double arrows in FIGS. 1-5. This includes generating power in the case of the PM machine operating as a generator, or driving a motor in the case of the PM machine operating as a motor. The method includes detecting a fault between at least two of the phase windings or a ground fault in any phase winding, and disconnecting respective return legs of all of the phase windings from a neutral point. This allows the permanent magnet to continue to rotate relative to the plurality of phase windings after the return legs are disconnected from the neutral point without ongoing damage.

Potential advantages of systems and methods as disclosed herein include the following. The stator electrical windings can be simplified allowing for improved manufacturability and reliability. There can be an ability to move protection circuits out of the PM machine into the same location as a generator/motor return switch, which lowers the volume of the PM machine and increases reliability. The systems and methods herein can allow for fast protection against electrical faults, e.g. as fast as fault protection techniques for synchronous machines. The systems and methods as disclosed herein can protects against many types of faults including line-line, 3-phase, and line-neutral. The systems and methods disclosed herein can be used in place of PM machine output contactors. The protection can be able to be reset if desired. Systems and methods disclosed herein do not rely on the PM machine going to low or zero speed. Systems and methods disclosed herein allow for the use of low impedance generators which do not have to limit fault current to the continuous current carrying capability of the conductors. The generator neutral can be available external to the machine for current/voltage sensing.

While shown and described herein in the context of three-phase machines, those skilled in the art will readily appreciate that the systems and methods as disclosed herein can readily be scaled to multi-phase machines with any suitable number of phases. Similarly, those skilled in the art having had the benefit of this disclosure will readily appreciate that any suitable type of return switches can be used without departing from the scope of this disclosure, such as mechanical or solid state. Any combination of phases can be used in order to isolate fault currents in accordance with this disclosure.

The methods and systems of the present disclosure, as described above and shown in the drawings, provide for fault protection in PM machines such as generators and motors, even wherein the machine may continue to undergo rotor rotation after a fault manifests. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a permanent magnet (PM) machine including a first phase winding, a second phase winding, and a third phase winding and a permanent magnet configured to rotate relative to the first, second, and third phase windings, wherein the first phase winding has a first main leg and a first return leg extending from the first phase winding, wherein the second phase winding has a second main leg and a second return leg extending from the second phase winding, and wherein the third phase winding has a third main phase leg and a third return leg extending from the third phase winding; and
a return switch unit operatively connected to the return legs of the first, second, and third phase windings, wherein the return switch unit includes a switch configured to (i) connect the return legs of the first, second, and third phase windings to a neutral node in the return switch unit in a normal state and (ii) disconnect the return legs of the first, second, and third phase windings from the neutral node in a fault protection state;
wherein the neutral node is a floating or grounded neutral node that is connected only to the return legs of the first, second, and third phase windings via the switch.

2. The system as recited in claim 1, wherein the return switch unit includes a feedback system configured to trigger the switch into the fault protection state upon a short circuit fault between two or more of the main legs of the first, second, and third phase windings or a ground fault in one or more of the main legs.

3. The system as recited in claim 2, wherein the feedback system includes one or more fault detection sensors operatively connected to logic and an actuator configured to drive the switch with a fault detected, wherein the feedback system is located external to the PM machine.

4. The system as recited in claim 1, wherein the return legs of the first, second, and third phase windings extend external from the PM machine, and wherein the return switch unit is external to the PM machine.

5. The system as recited in claim 1, wherein the PM machine represents a PM generator that is configured to:
generate power prior to disconnecting the return legs of the first, second, and third phase windings; and
cease generation of power upon disconnecting the return legs of the first, second, and third phase windings while the permanent magnet continues to rotate relative to the first, second, and third phase windings.

6. The system as recited in claim 1, wherein the PM machine represents a PM motor that is configured to:
use electrical power supplied to the phase windings to power rotation of the permanent magnet in the PM motor prior to disconnecting the return legs of the first, second, and third phase windings; and
cease to drive rotation of the permanent magnet relative to the first, second, and third phase windings upon disconnecting the return legs of the first, second, and third phase windings.

7. The system as recited in claim 1, wherein the return switch unit is configured to:
ground the neutral node prior to detecting a fault; and
disconnect the return legs of the first, second, and third phase windings from the neutral node in response to detecting the fault.

8. A system comprising:
a permanent magnet (PM) machine including a first phase winding, a second phase winding, and a third phase winding and a permanent magnet configured to rotate relative to the first, second, and third phase windings, wherein the first phase winding has a first main leg and a first return leg extending from the first phase winding, wherein the second phase winding has a second main leg and a second return leg extending from the second phase winding, and wherein the third phase winding has a third main phase leg and a third return leg extending from the third phase winding; and
a return switch unit operatively connected to the return legs of the first, second, and third phase windings, wherein the return switch unit includes a switch;
wherein the switch is a triple pole single throw (3PST) switch configured to (i) connect the return legs of the first, second, and third phase windings to a neutral node in a normal state and (ii) disconnect the return legs of the first, second, and third phase windings from the neutral node in a fault protection state.

9. The system as recited in claim 8, wherein the neutral node is connected to ground aboard an aircraft.

10. The system as recited in claim 8, wherein the PM machine is a generator, and wherein the main legs of the first, second, and third phase windings connect to a rectifier.

11. The system as recited in claim 10, further comprising a main line contactor connecting between the rectifier and the main legs of the first, second, and third phase windings, the main line contactor configured to selectively disconnect the generator from the rectifier.

12. The system as recited in claim 8, wherein the PM machine is a motor, wherein the main legs of the first, second, and third phase windings connect to a motor controller, and wherein the return switch unit is a motor return switch unit.

13. The system as recited in claim 12, further comprising:
a PM generator with a first fourth phase winding, a fifth phase winding, and a sixth phase winding, wherein the fourth, fifth, and sixth phase windings of the PM generator connect to the motor controller and are configured to supply power to the motor; and
a generator return switch unit operatively connected to return legs of the fourth, fifth, and sixth phase windings of the PM generator, wherein the generator return switch unit includes a second switch configured to (i) connect the return legs of the fourth, fifth, and sixth phase windings of the PM generator to a second neutral node in the generator return switch unit in a normal state and (ii) disconnect the return legs of the fourth, fifth, and sixth phase windings of the PM generator from the second neutral node in a fault protection state.

14. The system as recited in claim 13, wherein the second neutral node in the generator return switch unit and the neutral node in the motor return switch unit are both grounded to a ground aboard an aircraft.

15. A method of fault protection comprising:
rotating a permanent magnet relative to a plurality of phase windings in a permanent magnet (PM) machine;
detecting a fault between at least two of the phase windings or a ground fault of one or more of the phase windings;
disconnecting respective return legs of all of the phase windings from a neutral node; and
allowing the permanent magnet to continue to rotate relative to the plurality of phase windings after the return legs are disconnected from the neutral node;
wherein the neutral node is a floating or grounded neutral node that is connected only to the return legs of the phase windings via a switch.

16. The method as recited in claim 15, wherein the permanent magnet and the phase windings are part of a PM generator, the method further comprising:
generating power with the PM generator prior to disconnecting the return legs; and
ceasing generation of power with the PM generator upon disconnecting the return legs while the permanent magnet continues to rotate relative to the phase windings.

17. The method as recited in claim 15, wherein the permanent magnet and the phase windings are part of a PM motor, the method further comprising:
using electrical power supplied to the phase windings to power rotation of the permanent magnet in the PM motor prior to disconnecting the return legs; and
ceasing to drive rotation of the permanent magnet relative to the phase windings upon disconnecting the return legs while the permanent magnet continues to rotate relative to the phase windings.

18. The method as recited in claim 15, further comprising grounding the neutral node prior to detecting the fault.

19. The method of claim 15, wherein the return legs of the phase windings are disconnected from the neutral node using a triple pole single throw (3PST) switch that connects the return legs of the phase windings to the neutral node in a normal state and disconnects the return legs of the phase windings from the neutral node in a fault protection state.

20. The method of claim 15, wherein the main legs of the phase windings are connected to a rectifier or a motor controller.

* * * * *